US005491615A

United States Patent [19]

Nichols

[11] Patent Number: 5,491,615

[45] Date of Patent: Feb. 13, 1996

[54] LIGHT ATTACHMENT FOR A THERMOSTAT

[76] Inventor: Michael P. Nichols, 1401 33rd St. N., Texas City, Tex. 77590

[21] Appl. No.: 265,749

[22] Filed: Jun. 27, 1994

[51] Int. Cl.[6] .................... F21V 21/14; G01D 11/28

[52] U.S. Cl. .................... 362/23; 362/85; 362/147; 362/287

[58] Field of Search .................... 362/23, 85, 109, 362/253, 277, 432, 287, 418, 427, 812, 147

[56] References Cited

U.S. PATENT DOCUMENTS

| | | | |
|---|---|---|---|
| 2,698,895 | 1/1955 | Olson . | |
| 2,816,213 | 12/1957 | McIntosh . | |
| 3,009,051 | 11/1961 | Bittrolff | 362/23 |
| 3,459,935 | 8/1969 | Bruner | 362/418 |
| 3,764,793 | 10/1973 | Binzer | 362/85 |
| 4,831,500 | 5/1989 | McNemar . | |
| 4,905,127 | 2/1990 | Kaminski . | |
| 4,949,230 | 8/1990 | Burmeister . | |
| 5,055,977 | 10/1991 | Acquanetta . | |
| 5,113,318 | 5/1992 | Conley . | |
| 5,172,974 | 12/1992 | Riban | 362/23 |
| 5,197,941 | 3/1993 | Whitaker . | |

*Primary Examiner*—Ira S. Lazarus
*Assistant Examiner*—Y. Quach
*Attorney, Agent, or Firm*—Bush, Moseley, Riddle & Jackson

[57] ABSTRACT

A light attachment (10) for fitting over a thermostat (T) includes a mounting flange (14) fitting behind the thermostat (T) and clamped by the thermostat (T) against the wall (W). Flange (14) includes a holder (50) extending above the top of the thermostat (T) for advertising indicia on a card (62) within a transparent cover (58) over holder (50). The advertising indicia on the card (62) within cover (58) may, for example, contain information concerning a serviceman and a telephone number. A lamp (40) for illuminating the thermostat (T) is mounted on the end of an inturned end portion (34) of a pivotally mounted telescoping arm (30). The lamp (40) may be positioned at a desired location for illuminating thermostat (T) by pivoting of the arm (30) and rotation of a hood (42) over the lamp (40). Hood (42) includes an opening (44) for directing the light to a predetermined position on the thermostat (T).

12 Claims, 2 Drawing Sheets

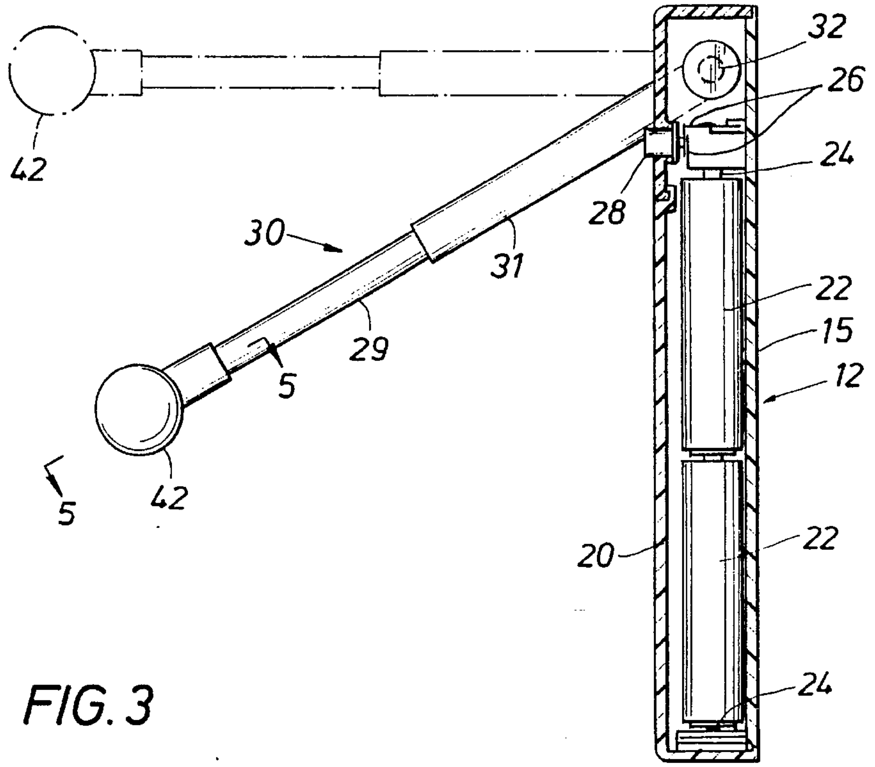
FIG. 3
FIG. 4
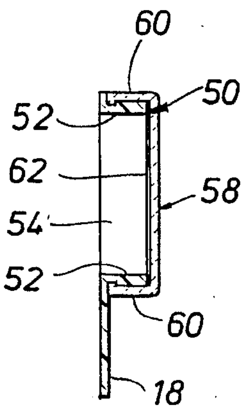
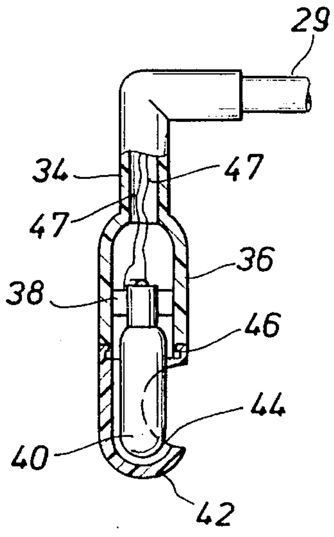
FIG. 5

LIGHT ATTACHMENT FOR A THERMOSTAT

FIELD OF THE INVENTION

This invention relates to a light attachment for a thermostat, and more particularly to such a light attachment for a wall mounted thermostat to illuminate the thermostat for visual observation.

BACKGROUND OF THE INVENTION

Heretofore, various types of light mountings or attachments have been provided for thermostats to provide illumination of the thermostats. For example, U.S. Pat, No. 5,113,318 dated May 12, 1992 shows a U-shaped light attachment fitting about a thermostat and having a light over the thermostat. The attachment is secured to a wall and includes a hood mounted about the light bulb to direct the light downwardly for illuminating the thermostat. A manually operable push button is provided for operation of the light bulb.

U.S. Pat. No. 2,698,895 dated Jan. 4, 1955 shows an illuminated thermostat having a lamp operated by a push button for energizing the lamp. The thermostat is supported on a base for the lamp and fasteners mount the thermostat and base on a wall. A control circuit is provided for the lamp which also determines if the thermostat is functioning properly. Thus, if the lamp is energized, the thermostat circuit is confirmed as functioning properly. A reflector is mounted over the light.

A light attachment for a remote control unit for controlling television, for example, is shown in U.S. Pat. No. 4,949,230 dated Aug. 14, 1990. A lamp is operated from a push button type switch and is mounted on a post which may be rotated or moved in an axial direction to allow the lamp to be adjusted to a predetermined position.

SUMMARY OF THE INVENTION

An object of the invention is to provide a light attachment for a thermostat including advertising indicia positioned thereon at a location to facilitate viewing by a user.

Another object of the invention is to provide such a light attachment having a bulb which is easily movable to a desired location for directing light against the thermostat.

A further object of the invention is to provide such a light attachment which may be easily clamped by a wall mounted thermostat against the wall for mounting of the light attachment.

The present invention is particularly directed to a light attachment for a wall mounted thermostat and including advertising indicia on the light attachment positioned at a location easily visible or observable to a user or operator of the thermostat. The advertising may contain for example, the name and phone number of a serviceman for an air conditioning unit or a heating unit controlled by the thermostat. The light attachment includes a rectangular holder or retainer on an arm positioned over the thermostat, and a separate indicia carrying member forms an insert which is press fitted within the rectangular holder. The light attachment is easily mounted by clamping of the thermostat against a thin mounting flange of the attachment behind the thermostat.

Another feature includes the mounting of the bulb or lamp so that it is movable to a predetermined position for illuminating the thermostat or advertising indicia for viewing by a user. The bulb is mounted on the free end of a pivoted telescoping arm for movement to a desired position with the telescoping arm adjusted to a predetermined length. A hood on the arm extends about the bulb and has an opening for directing the light toward the thermostat.

Other objects, features, and advantages of the invention will be more apparent from the following specification and drawings.

BRIEF DESCRIPTION OF THE DRAWINGS

FIG. 3 is a sectional view taken generally along line 3—3 of FIG. 1;

FIG. 4 is a sectional view taken generally along 4—4 of FIG. 1; and

FIG. 5 is an enlarged sectional view of the receptacle for the light bulb taken generally along line 5—5 of FIG. 3.

DESCRIPTION OF THE INVENTION

Figure 2:
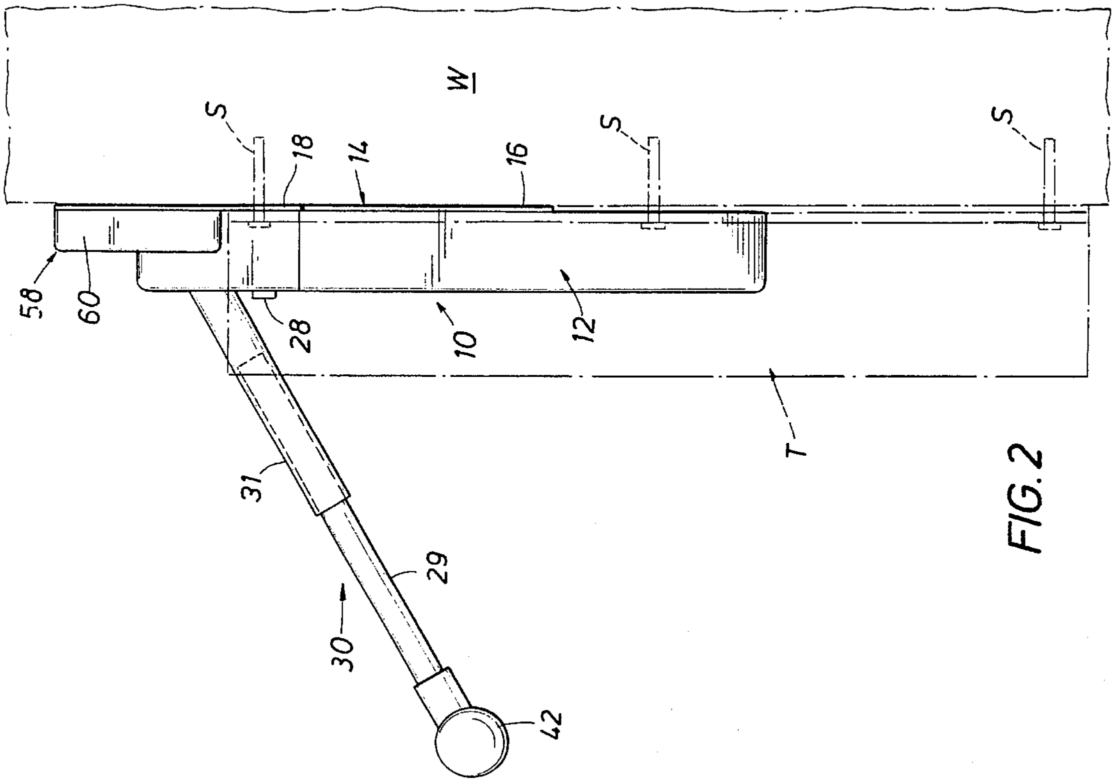
FIG. 2 is a side elevation of the light attachment shown in FIG. 1.
Figure 1:
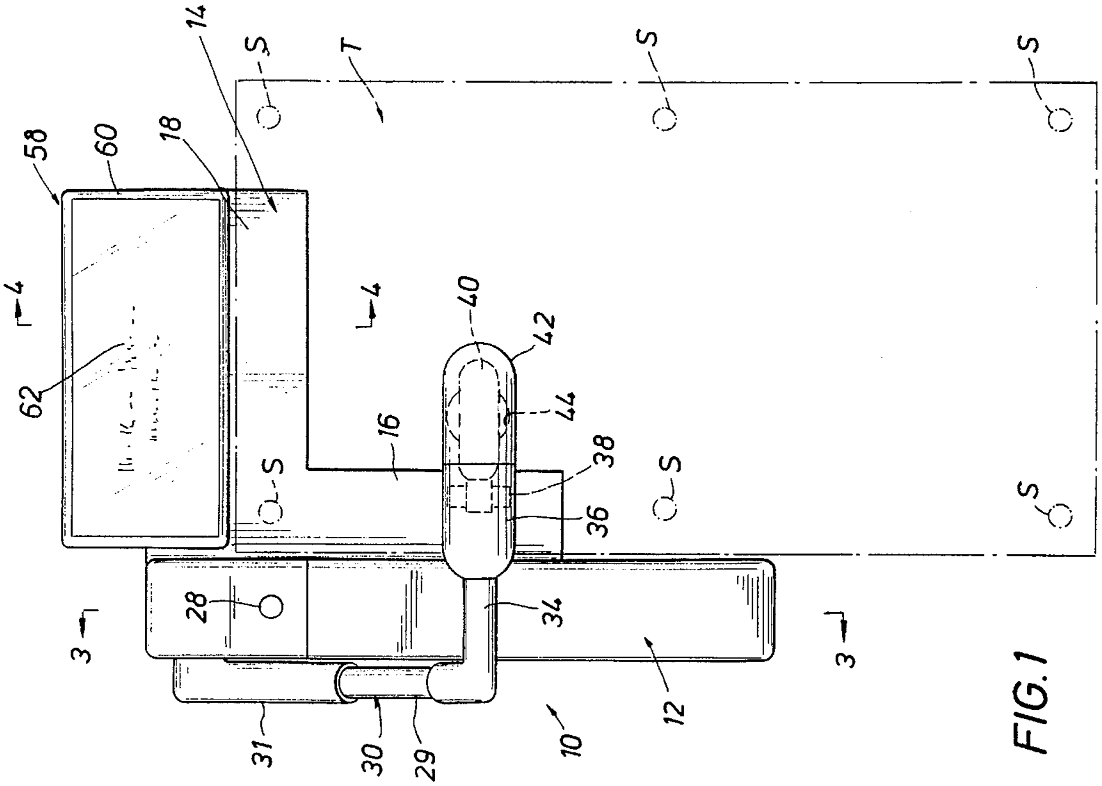
FIG. 1 is a front elevation of the light attachment comprising the present invention shown positioned adjacent a thermostat for illumination thereof and clamped by the thermostat against the wall.

The light attachment comprising the present invention is shown generally at 10 positioned adjacent a thermostat shown generally at T in broken lines and mounted on a wall W. Light attachment 10 includes a housing generally indicated at 12 and an integral angle-shaped thin mounting flange shown generally at 14 extending laterally from the rear of light attachment 10. Mounting flange 14 is formed of a thin plastic material and includes a lower support leg 16 and an upper leg 18. Thermostat T is secured to wall W with a plurality of screws S having a mounting base adapted to be secured to the wall. To position light attachment 10 on an existing thermostat T, some of the screws S are removed to permit flange 14 to be slipped behind thermostat T. Then the screws S are reinserted to clamp flange 14 tightly against wall W. Screws S may extend through flange 14 since it is formed of a thin plastic material, such as polyethylene, for example. Thermostat T may be of various shapes, such as circular, rectangular, or square, for example, and yet function to clamp light attachment 10 against wall W. Flange 14 may also be formed of various shapes as may be desired for various thermostats.

Housing 12 having a base 15 defines a compartment 20 having a pair of batteries 22 therein arranged in end to end relation. Battery contacts 24 are provided at the ends of batteries 22 and a pair of switch contacts are shown at 26 connected by suitable circuitry. A push button 28 is manually operated for closing switch contacts 26 for illumination of thermostat T as will be explained further.

A lamp mounting arm is shown generally at 30 and has telescoping portions 29, 31. Telescoping portion 29 may be manually pushed in and out to lengthen or shorten arm 30. Arm portion 31 is pivotally mounted at 32 to housing 12 for pivotal movement of arm 30. Arm portion 29 has an inturned or right angled end portion 34 at its free end and a lamp receptacle 36 is secured to an end of inturned end portion 34. Receptacle 36 has a lamp socket 38 therein adapted to receive a lamp or light bulb 40. A hood 42 extends over bulb 40 and has an opening 44 therein for direction of the light from bulb 40 in a desired direction. Hood 42 is mounted for rotative movement within a groove 46 on receptacle 36 and may be rotated to position opening 44 at a desired location for illuminating thermostat T. Arm 30 may be pivoted and arm portions 29, 31 adjusted to position lamp or bulb 40 at a desired location. Then, hood 42 may be rotated for positioning of opening 44 at a desired position for directing light against thermostat T.

Suitable electric wiring, 47 or circuitry from contacts 26 is connected to bulb 40 and socket 38 for providing electrical energy to lamp 40. Upon manual depression inwardly on push button 28, contacts 26 are closed to permit the supply of electrical energy from batteries 22 to lamp 40 for energizing lamp 40 for directing light against thermostat T. Upon manual release of push button 28, contacts 26 open to deenergize lamp 40. Thus, electrical energy from batteries 22 is only used when push button 28 is manually depressed thereby providing a long life for batteries 22.

Referring particularly to FIG. 4, upper leg 18 of mounting flange 14 extends in a generally vertical direction above thermostat T and includes a holder generally indicated at 50 positioned above the upper end of thermostat T. Holder 50 has an open rectangular body forming an open area 54 defined by sides 52 extending outwardly from wall W over the top of thermostat T. An outer transparent cover 58 has an outer peripheral flange 60 which is adapted to fit over sides 52 in an interfitting relation. A plastic rectangular card 62 has advertising indicia thereon such as the name, address, and telephone number of a serviceman for an air conditioning or heating unit. After advertising indicia has been positioned on card 62, card 62 is positioned within transparent cover 58 with a press fit or pressure sensitive adhesive. Then, cover 58 with card 62 therein is fitted over sides 52 of holder 50. Card 62 may also be clamped against the adjacent contacting edges of sides 52 as shown in FIG. 4. Thus, any suitable indicia, such as a name of a serviceman or repair company may be imprinted on card 62 with a telephone number so that such information would be readily available to a user in the event of malfunctioning of thermostat T.

It now will be recognized that a new and improved light attachment for a thermostat has been disclosed which meets all of the objectives of the present invention, and which incorporates numerous unique features and advantages as set forth herein. Since certain changes or modifications may be made in the disclosed embodiment without departing from the inventive concepts involved, it is the aim of the appended claims to cover all such changes and modifications falling within the true spirit and scope of the present invention.

What is claimed is:

1. A light attachment for illuminating a wall mounted thermostat having a mounting base secured to a wall, comprising:

a housing having a compartment to receive at least one battery and configured to position adjacent said thermostat;

a movable arm having a pivot end pivotally mounted to said housing and defining a free end;

a lamp mounted adjacent said free end of said moveable arm;

electrical circuitry, connected between said battery and said lamp for the selective supply of electrical energy to said lamp from said battery; said electrical circuitry including manually operable switch means to permit selectively the supply of electrical energy to said lamp for illuminating said lamp;

said movable arm being pivotally movable with said lamp to position said lamp at a desired position relative to said thermostat for illumination of a desired portion of said thermostat; and said housing including a mounting flange extending from one side thereof and configured to position between the mounting base of the thermostat and the wall to be clamped against the wall by the mounting base of the thermostat so as to mount said housing alongside said thermostat.

2. A light attachment as set forth in claim 1:

said mounting flange extending from said housing to a position above the thermostat and having sides defining a generally rectangular holder configured to position over a top of the thermostat;

an indicia carrying member being located in supported relation with said generally rectangular sides of said holder for viewing by a user of the thermostat; and transparent cover being in assembly with said holder and securing said indicia carrying member to said holder and in position for viewing through said transparent cover.

3. A light attached as set forth in claim 2:

said indicia carrying member comprising a card-like insert adapted to be retained in releasable assembly with said sides of said generally rectangular holder by said transparent cover.

4. A light attachment as set forth in claim 1:

said housing including a base and a holder extending from said base to a position above the thermostat, and an indicia carrying member being positioned by said holder for viewing by a user of the thermostat; and transparent cover retaining said indicia carrying member in releasable assembly with said holder and in position for viewing through said transparent cover.

5. A light attachment as set forth in claim 4:

said indicia carrying member comprising a card-like insert adapted to be releasably retained in assembly with said generally rectangular holder for viewing by the user of the thermostat.

6. A light attachment as set forth in claim 1:

said arm having telescoping arm portions for adjusting the length of said arm.

7. A light attachment as set forth in claim 1:

a hood being rotatably attached to said free end of said arm and receiving said lamp therein, said hood having an opening for directing light from said lamp, and means to permit rotative movement of said hood relative to said lamp to direct light in a predetermined direction toward said thermostat.

8. A light attachment for illuminating a wall mounted control device having upper and, lower end, sides and a mounting base secured to a wall and having indicia thereon to be viewed by an operator; said light attachment comprising:

mounting flange extending from said housing and configured to be secured to said wall by said mounting base;

a housing having a compartment to receive at least one battery;

a light support arm being pivotally mounted to said housing and defining a free end having an electric lamp thereon for selective positioning relative to said housing;

electrical circuitry between said battery and said lamp for supplying electrical energy to said lamp from said battery, said electrical circuitry including manually operable switch means to permit selectively the supply of electrical energy to said lamp for energizing said lamp;

an indicia carrying member extending from said mounting flange and configured to position above said control device for viewing by an operator of the control device; and a hood associated with said free end and mounted over said lamp and having an opening for directing light energy from said lamp, and means to permit rotative movement of said hood to direct light in a predetermined direction toward said control device.

9. A light attachment as set forth in claim 8:

a holder being supported by said mounting flange and adapted for positioning above said control device; and said indicia carrying member being supported by a transparent cover and said holder in a position for viewing by the operator of said control device.

10. The light attachment of claim 8, wherein:

said light support arm having telescoping arm sections.

11. The light attachment of claim 8, further comprising:

a light receptacle being mounted to said light support arm adjacent said free end.

12. The light attachment of claim 8, further comprising:

a holder element being defined by said mounting flange and configured to position above said control device;

said indicia carrying member configured to be positioned in supported assembly with said holder element; and a transparent cover being in assembly with said holder and securing said indicia carrying member in position for viewing through said transparent cover.

* * * * *